United States Patent
Niwa

(12)
(10) Patent No.: US 6,334,688 B1
(45) Date of Patent: Jan. 1, 2002

(54) ILLUMINATING DEVICE, AN OPERATING DEVICE HAVING THE ILLUMINATING DEVICE, AND AN AUDIO APPARATUS INCLUDING THE OPERATING DEVICE

(75) Inventor: Haruo Niwa, Hamamatsu (JP)

(73) Assignee: Yamaha Corporation, Shizouka-ken (JP)

( * ) Notice: Subject to any disclaimer, the term of this patent is extended or adjusted under 35 U.S.C. 154(b) by 0 days.

(21) Appl. No.: 09/480,169

(22) Filed: Jan. 10, 2000

(30) Foreign Application Priority Data

Jan. 11, 1999 (JP) .................................................. 11-004435

(51) Int. Cl.[7] .................................................. G01D 11/28
(52) U.S. Cl. ................................. 362/26; 362/23; 362/86
(58) Field of Search .................................... 362/23, 26, 28, 362/30, 24, 29, 86; 116/286, 287, 310, DIG. 5, DIG. 36, DIG. 26

(56) References Cited

U.S. PATENT DOCUMENTS 3,699,915 A * 10/1972 Greene ............................ 362/28
5,093,764 A * 3/1992 Hasegawa et al. ............. 362/26
5,143,434 A * 9/1992 Ohta et al. ...................... 362/23

* cited by examiner

Primary Examiner—Y Quach Lee
(74) Attorney, Agent, or Firm—Reed Smith Hazel & Thomas LLP

(57) ABSTRACT

An illuminating device receives light emitted from a light source (22), and emits light. The illuminating device includes a tubular light guiding member (21) which receives the light emitted from the light source (22), and guides the light therein. The illuminating device further includes an annular luminous body (23) which is connected to one end portion of the light guiding member (21), and has a tapered surface (30) which is made to emit light by the light guided by the light guiding member (21). In this construction, the light entering the light guiding member (21) is guided spirally in the light guiding member (21), and is irregularly reflected by the tapered surface (30) so that the tapered surface (30) emits light.

21 Claims, 10 Drawing Sheets

ILLUMINATING DEVICE, AN OPERATING DEVICE HAVING THE ILLUMINATING DEVICE, AND AN AUDIO APPARATUS INCLUDING THE OPERATING DEVICE

BACKGROUND OF THE INVENTION

1. Field of the Invention

The present invention relates to an illuminating device which makes an annular luminous body emit light, an operating device having the illuminating device, and an audio apparatus including the operating device.

The present application is based on Japanese Patent Application No. Hei. 11-4435, which is incorporated herein by reference.

2. Description of the Related Art

There has been known an operating knob used in an electric apparatus such as an audio apparatus or the like. FIG. 1 shows an example of an operating knob and a related illuminating device that emits light to illuminate the outer circumferential side of the operating knob. A light guiding member 2 is formed in a hollow cylindrical manner. A knob 1 is fittable into a hollow portion of the light guiding member 2. The light guiding member 2 has an annular luminous surface 3 at an end side thereof (the left side in FIG. 1), and a plurality of illuminants 4 (two illuminants in FIG. 1) such as LEDs or the like are disposed at the opposite end side of the light guiding member 2. Under this construction, light is emitted from the illuminants 4 toward portions of the light guiding member 2, and is guided by the light guiding member 2 so as to be emitted from the luminous surface 3.

Incidentally, in the aforementioned illuminating device disposed on the outer circumferential side of the knob 1, only two parts of the luminous surface 3 existing in the direction of irradiation of the illuminants 4 shine brightly as hatched portions in FIG. 2, the whole region of the outer circumference of the knob 1 cannot be illuminated. If the whole region of the outer circumferential of the knob 1 is to be illuminated, it is necessary to provide a large number of illuminants 4, and therefore, the construction is made to be complicated.

SUMMARY OF THE INVENTION

With the above aforementioned circumstances in view, it is an object of the present invention is to provide an illuminating device which can make an annular luminous body emit light in a wider range with a simple construction, an operating device having such the illuminating device, and an audio apparatus including the operating device.

In order to achieve the above object, according to the first aspect of the present invention, there is provided an illuminating device for receiving light emitted from a light source and emitting light, the illuminating device which comprises a tubular-light guiding member that is capable of guiding light, and an annular luminous body connected to a first end portion of the light guiding member, the luminous body which is made to emit light by the light guided by the light guiding member.

According to the second aspect of the present invention depending on the first aspect, it is preferable that the luminous body includes a tapered surface which is made to emit the light.

According to the third aspect of the present invention depending on the second aspect, it is preferable that the tapered surface is processed in one of an aventurine-like manner and a frosted-glass like manner.

According to the fourth aspect of the present invention depending on the second aspect, it is preferable that the tapered surface has a concave surface.

According to the fifth aspect of the present invention depending on the first aspect, it is preferable that the light source is directed to a second end portion of the light guiding member, and emits the light in a direction substantially parallel with an axial direction of the light guiding member.

According to the sixth aspect of the present invention depending on the first aspect, it is preferable that the illuminating device further comprises a light entering portion for leading the light emitted from the light source into the light guiding member so as to be spirally guided in the light guiding member.

According to the seventh aspect of the present invention depending on the first aspect, it is preferable that the light guiding member formed in a hollow cylindrical manner.

According to the eighth aspect of the present invention depending on the first aspect, it is preferable that the light source emits beam-like light toward the light guiding member.

According to the ninth aspect of the present invention depending on the first aspect, it is preferable that the light guiding member is capable of spirally guiding the light.

According to the tenth aspect of the present invention depending on the first aspect, it is preferable that the illuminating device further comprises a reflection member, wherein the light emitted from the light source is reflected by the reflection member, and enters the light guiding member.

According to the eleventh aspect of the present invention depending on the sixth aspect, it is preferable that the illuminating device further comprises a reflection member disposed on the light entering portion, wherein the light emitted from the light source is reflected by the reflection member, and enters the light guiding member.

According to the twelfth aspect of the present invention depending on the first aspect, it is preferable that the light emitted from the light source enters a second end portion of the light guiding member, and is spirally guided by the light guiding member.

According to the thirteenth aspect of the present invention depending on the second aspect, it is preferable that the tapered surface has a convex surface.

According to the fourteenth aspect of the present invention depending on the second aspect, it is preferable that the tapered surface has an angular surface.

Further, in order to achieve the above object, according to the fifteenth aspect of the present invention, there is provided an operating device which comprises a light source which emits light, a tubular-light guiding member having a hollow portion, the light guiding member that receives the light emitted from the light source, and is capable of guiding the light, an annular luminous body connected to a first end portion of the light guiding member, the luminous body which is made to emit light by the light guided by the light guiding member, and an operating knob partially insertable in the hollow portion of the light guiding member.

According to the sixteenth aspect of the present invention depending on the fifteenth aspect, it is preferable that the luminous body includes a tapered surface which is made to emit the light.

According to the seventeenth aspect of the present invention depending on the sixteenth aspect, it is preferable that the tapered surface is processed in one of an aventurine-like manner and a frosted-glass like manner.

According to the eighteenth aspect of the present invention depending on the sixteenth aspect, it is preferable that the tapered surface has a concave surface.

According to the nineteenth aspect of the present invention depending on the fifteenth aspect, it is preferable that the light source is directed to a second end portion of the light guiding member, and emits the light in a direction substantially parallel with an axial direction of the light guiding member.

According to the twentieth aspect of the present invention depending on the fifteenth aspect, it is preferable that the operating device further comprises a light entering portion for leading the light emitted from the light source into the light guiding member so as to be spirally guided in the light guiding member.

According to the twenty-first aspect of the present invention depending on the fifteenth aspect, it is preferable that the light guiding member formed in a hollow cylindrical manner.

According to the twenty-second aspect of the present invention depending on the fifteenth aspect, it is preferable that the light source emits beam-like light toward the light guiding member.

According to the twenty-third aspect of the present invention depending on the fifteenth aspect, it is preferable that the light guiding member is capable of spirally guiding the light.

According to the twenty-fourth aspect of the present invention depending on the fifteenth aspect, it is preferable that the operating device further comprises a reflection member, wherein the light emitted from the light source is reflected by the reflection member, and enters the light guiding member.

According to the twenty-fifth aspect of the present invention depending on the twenties aspect, it is preferable that the operating device further comprises a reflection member disposed on the light entering portion, wherein the light emitted from the light source is reflected by the reflection member, and enters the light guiding member.

According to the twenty-sixth aspect of the present invention depending on the fifteenth aspect, it is preferable that the light emitted from the light source enters a second end portion of the light guiding member, and is spirally guided by the light guiding member.

According to the twenty-seventh aspect of the present invention depending on the sixteenth aspect, it is preferable that the tapered surface has a convex surface.

According to the twenty-eighth aspect of the present invention depending on the sixteenth aspect, it is preferable that the tapered surface has an angular surface.

According to the twenty-ninth aspect of the present invention, it is preferable that an audio apparatus comprises an operating device defined in the aforementioned fifteenth aspect of the present invention.

BRIEF DESCRIPTION OF THE DRAWINGS

FIG. 14A shows a pure columnar shape, FIG. 14B shows a sightly-narrowed bottom shape, and FIG. 14C shows a slightly-widened bottom shape.

DETAILED DESCRIPTION OF THE PREFERRED EMBODIMENTS

Preferred embodiments of the present invention will now be described in detail with reference to FIGS. 3 to 14C.

Figure 3:
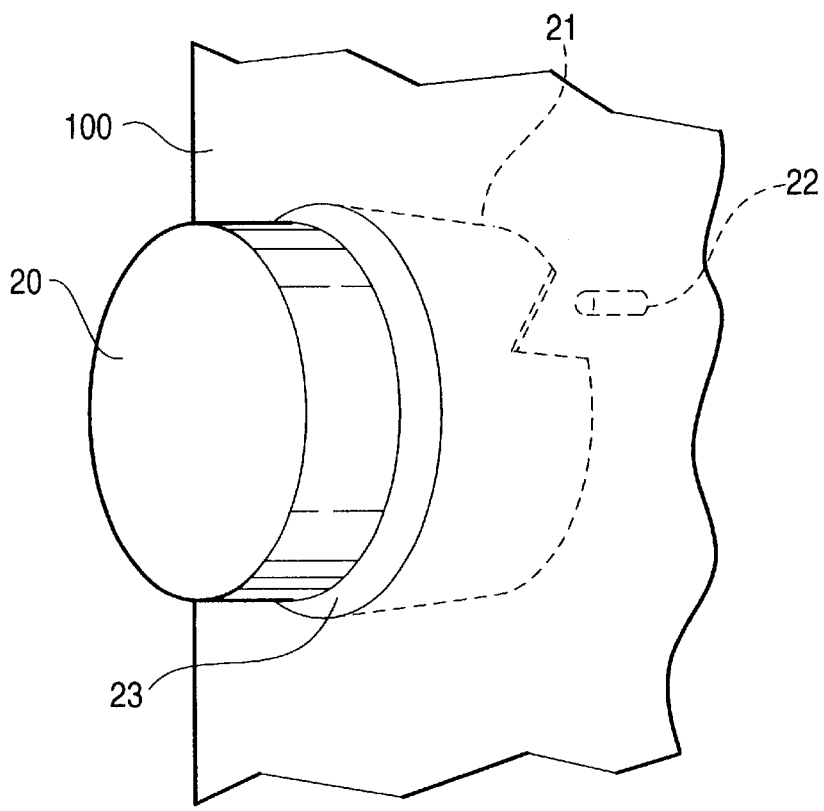
FIG. 3 is a perspective view showing the external appearance of an operating device with an illuminating device according to an embodiment of the present invention.

FIG. 3 is a perspective view showing the external appearance of an operating device having an illuminating device according to an embodiment of the present invention. As shown in FIG. 3, the illuminating device includes a light guiding member 21 formed in a hollow cylindrical manner, and a light source 22 for emitting beam-like light toward the light guiding member 21. The light guiding member 21 has a hollow portion in which a columnar knob 20 is inserted. The illuminating device and the knob 20 are provided to be used, for example, as an operating device such as a volume knob of an audio apparatus or the like. The light guiding member 21 and the light source 22 are stored inside a body 100 of the audio apparatus or the like. Further, this operating device is provided so as to be rotatable relative to the body 100. When a user rotates the knob 20 while holding the knob 20, user's instructions are transmitted to an electronic circuit (not shown) etc. disposed inside the body 100 with the operations of the knob 20.

Figure 4:
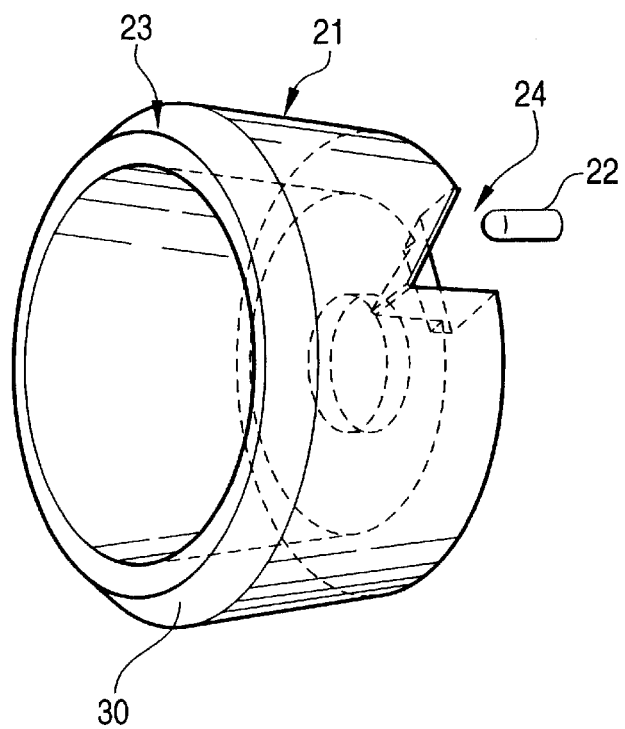
FIG. 4 is a perspective view showing a light guiding member which is a constituent element of the illuminating device of FIG. 3.

As shown in FIG. 4, the light guiding member 21 is a transparent member formed in a hollow cylindrical manner. A transparent resin such as an acrylic resin or the like, can be used as a material for the light guiding member 21. A light-transmissible material such as a translucent material, a slightly frosted material, etc., may be used as the transparent member. Further, an annular luminous body 23 is connected to the light guiding member 21, and is disposed on one end side in the axial direction of the light guiding member 21 so as to be exposed to the outside of the body 100 (see FIG. 3). Incidentally, the luminous body 23 may be molded integrally with the light guiding member 21.

Figure 5:
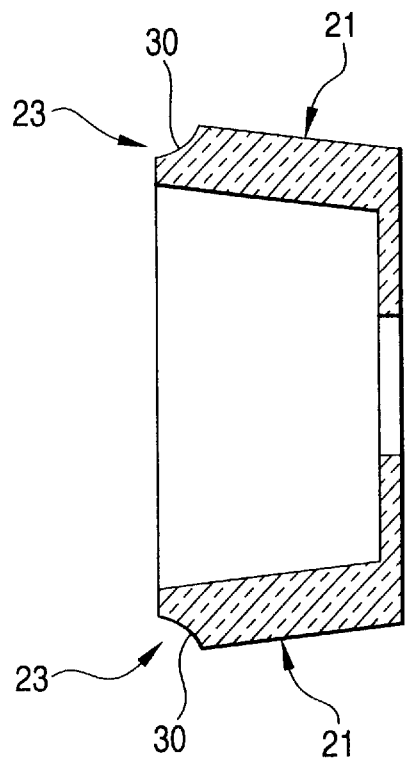
FIG. 5 is a side sectional view of the light guiding member of FIG. 4.

FIG. 5 is a side sectional view of the light guiding member 21. As shown in FIG. 5, the luminous body 23 is formed to be tapered. The luminous body 23 has a tapered surface 30 on its outer circumferential side. The tapered surface 30 is formed in a concave-surface manner. The tapered surface 30 is processed in an aventurine-like manner, a frosted-glass like manner, or the like.

Figure 6:
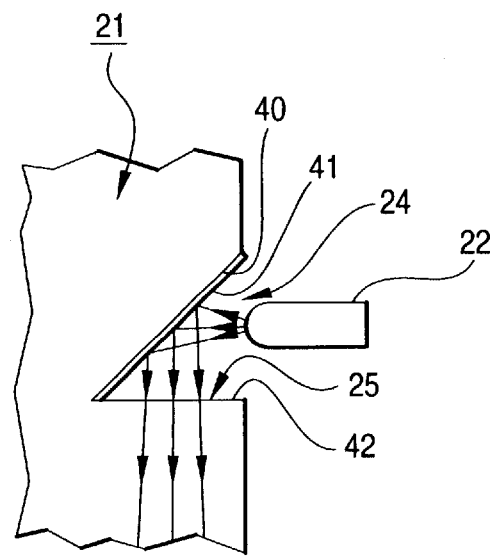
FIG. 6 shows a neighborhood of a light entering portion of the light guiding member of the illuminating device according to the embodiment.

Referring back to FIG. 4, a light entering portion 24 is disposed at the other end side opposite to the luminous body 23 in the axial direction of the light guiding member 21. As shown in FIG. 6, the light entering portion 24 includes a notch portion 25 which is formed by notching the light guiding member 21. The notch portion 25 has an inclined surface 40 which is inclined at about 45° (degrees) with respect to an irradiating direction of light emitted from the light source 22. A sheet mirror 41 is disposed on the inclined surface 40. Hence, light emitted from the light source 22 is reflected by the sheet mirror 41 as represented by the arrows in FIG. 6, and then enters the light guiding member 21 from a surface 42. The surface 42 has relation to the light guiding member 21 so that the angle between a vector perpendicular to the surface 42 and a vector in the axial direction of the light guiding member 21 is at about 90°. The light source 22 is formed to emit beam-like light in directions represented by the arrows in FIG. 6. That is, the light source 22 emits light in a direction substantially parallel with the axial direction of the light guiding member 21. An LED (Light Emitting Diode) unit etc., may be used as the light source 22. Alternatively, a lamp having a member such as a slit or the like for limiting the direction of the lamp's irradiation, may be used so that beam-like light is emitted toward the sheet mirror 41.

Figure 1:
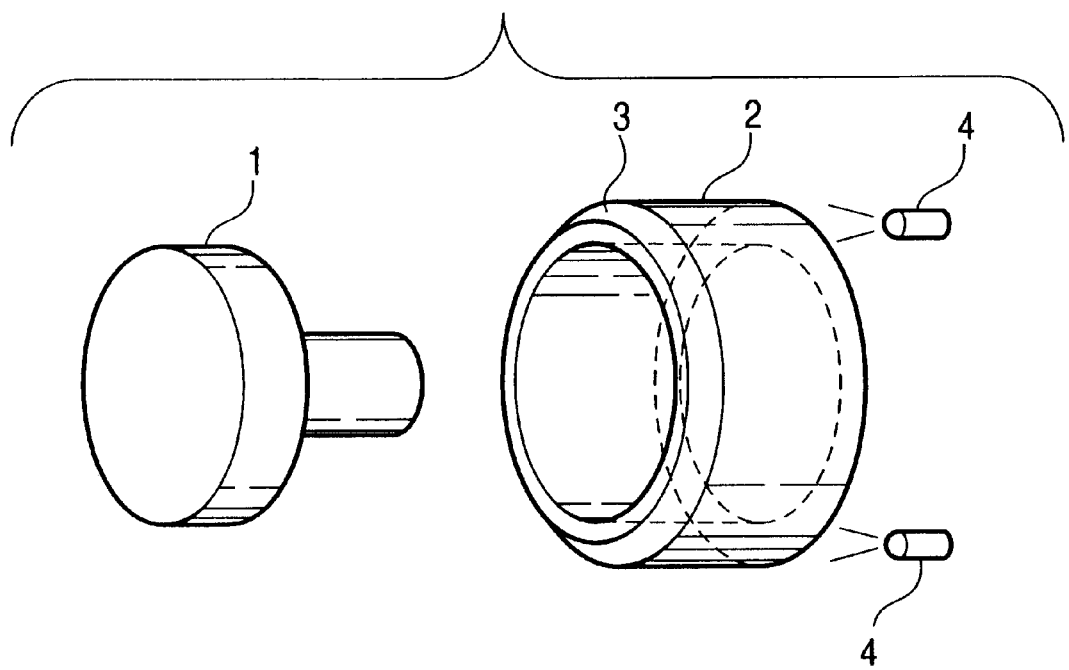
FIG. 1 shows an example of an operating knob with a related illuminating device that emits light to illuminate the outer circumferential side of the operating knob.
Figure 2:
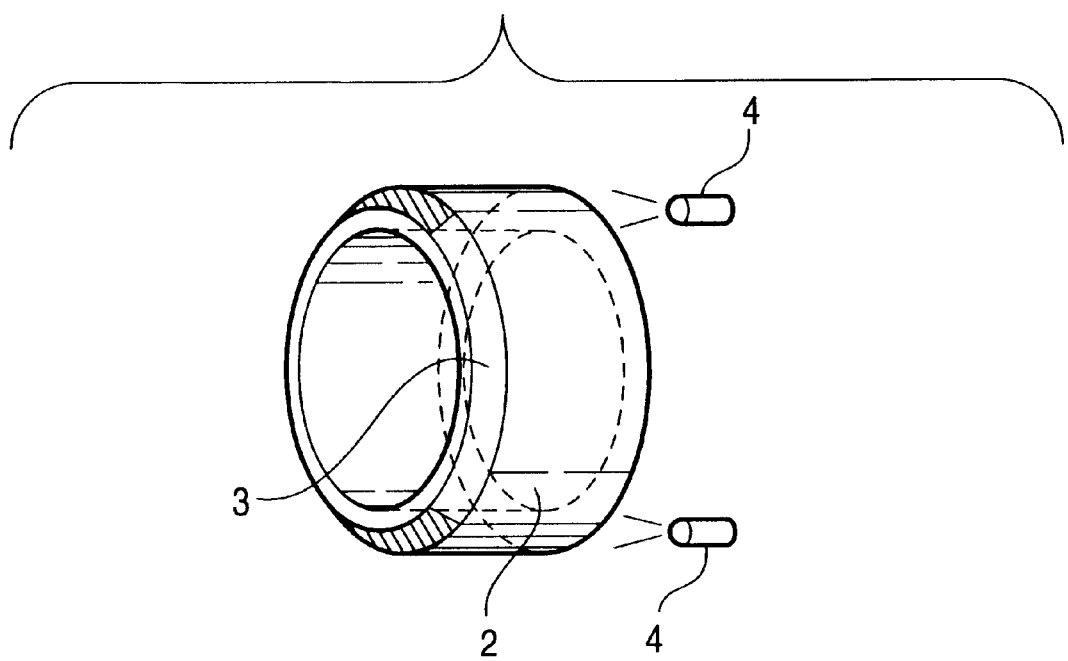
FIG. 2 is a view for explaining a luminous portion of a light guiding member which is a constituent element of the illuminating device.
Figure 7A:
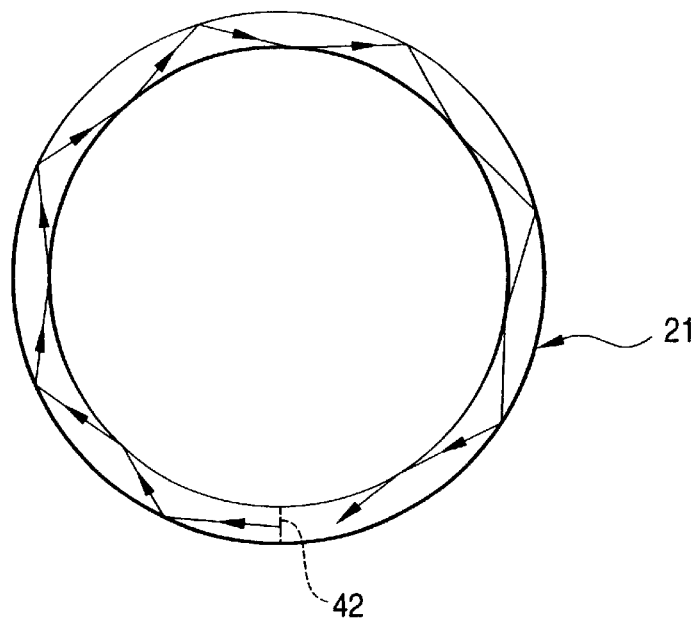
FIGS. 7A and 7B are views typically showing light guided spirally in the light guiding member of the illuminating device according to the embodiment.
Figure 7B:
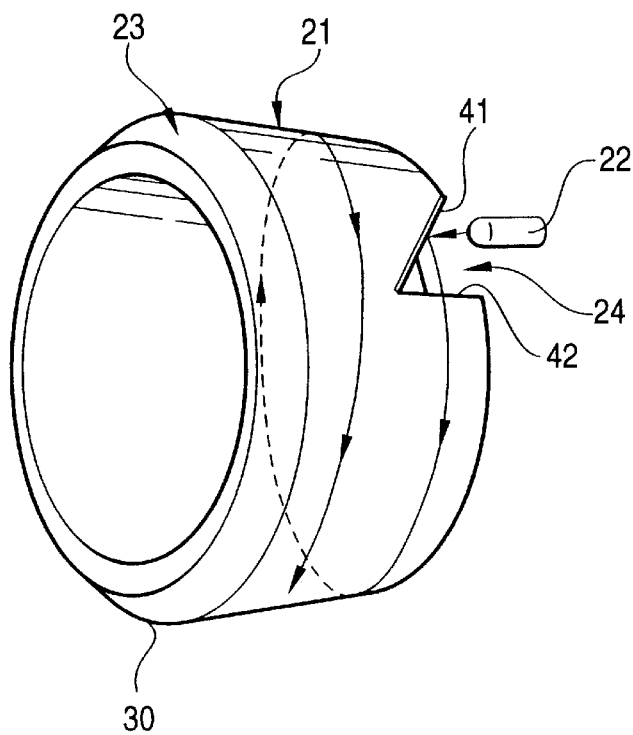
Figure 7C:
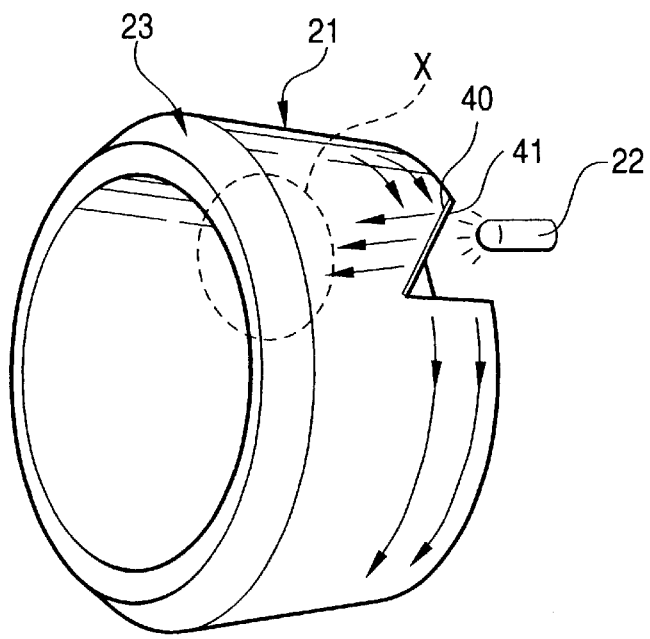
FIG. 7C shows a state in which a portion of a luminous body intensively emits light relatively.

As shown in FIGS. 7A and 7B, the most of light entering the light guiding member 21 from the light entering portion 24 as in the aforementioned manner is guided spirally along the cylindrical light guiding member 21 while being reflected by the interface between the light guiding member 21 and air. Thus, the light entering the light entering portion 24 is guided toward the luminous body 23 which is molded integrally with the light guiding member 21. Further, a part of the light entering the light guiding member 21 may not be guided spirally along the light guiding member 21 but guided toward the luminous body 23 while being reflected by the interface between the light guiding member 21 and air. The light guided in the light guiding member 21 as in the aforementioned manner is irregularly reflected by the tapered surface 30 processed in an aventurine-like manner, so that the tapered surface 30 emits light. At this time, since light emitted from the light source 22 toward the light guiding member 21 is guided spirally along the light guiding member 21, a wider region of the tapered surface 30 can be made to emit light without making the tapered surface 30 partially emit the light as in the related illuminating device shown in FIGS. 1 and 2. Further, in comparison with the related illuminating device shown in FIGS. 1 and 2, the amount of light emitted from the tapered surface 30 as laterally viewing the tapered surface 30 (i.e., as viewed in a direction which is substantially perpendicular to the axial direction of the light guiding member 21), can be increased. Therefore, the tapered surface 30 can be made to emit light in a wider region without providing a plurality of light sources, and further, the amount of light emitted from the tapered surface 30 as laterally viewing the tapered surface 30 can be increased. Accordingly, a more graceful illumination decorating function can be obtained. In order to make the luminous body 23 emit light as described above, in this embodiment, the tapered surface 30 is processed in an aventurine-like manner so that the amount of light emitted from the tapered surface 30 is increased and the luminous body 23 is made to emit light more evenly in a wider region. Further, low-diffusible and unidirectional beam-like light emitted from the light source 22 enters the light guiding member 21 so as to be prevented from leaking out of the light guiding member 21. As a result, the amount of light reaching the luminous body 23 is increased. Incidentally, according to the aforementioned construction, while the tapered surface 30 can be made to emit light in a wider region thereof, a part of light reflected by the sheet mirror 41 and entering the light guiding member 21 is reflected by the inclined surface 40 and guided toward the luminous body 23. Hence, a portion of the luminous body 23 corresponding to projection of the inclined surface 40 in the axial direction of the light guiding member 21 may have an increased amount of light emission relative to the other portions of the luminous body 23 (see FIG. 7C). FIG. 7C shows such the state in which a portion X of the luminous body 23 intensively emits light relatively.

Modified Examples of the Embodiment

The present invention is not limited to the aforementioned embodiment, and various modifications and changes can be considered as follows.

Figure 8:
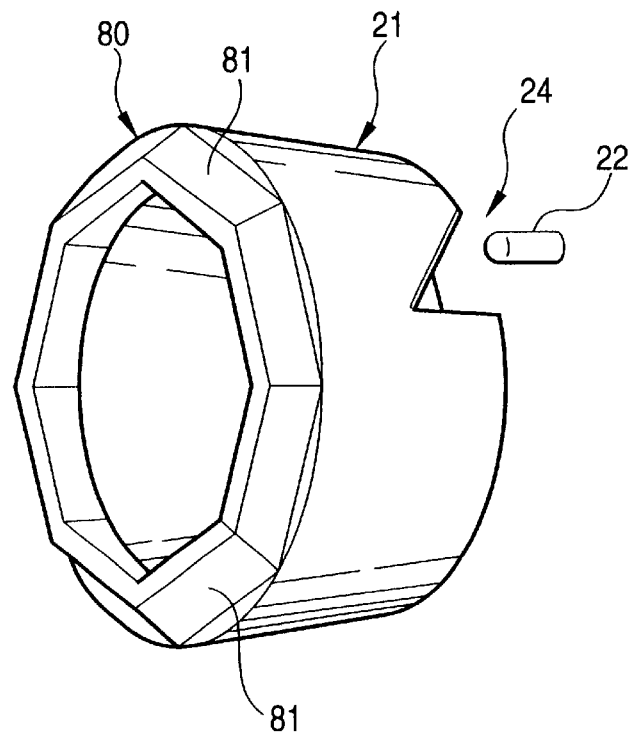
FIG. 8 is a perspective view showing the external appearance of a modified example of the illuminating device according to the present invention.

(1) Although the aforementioned embodiment has shown the case in which the annular luminous body 23 is used, the present invention is not limited thereto. For example, the present invention may be applied also to the case in which a luminous body 80 formed in an octagonal-ring like manner is used as shown in FIG. 8. In this case, inclined surfaces 81 processed in an aventurine-like manner may be formed as a substitute for the tapered surface 30 of the aforementioned embodiment. It is a matter of course that a luminous body may be formed in any polygonal-ring like manners other than the octagonal-ring like manner.

Figure 9:
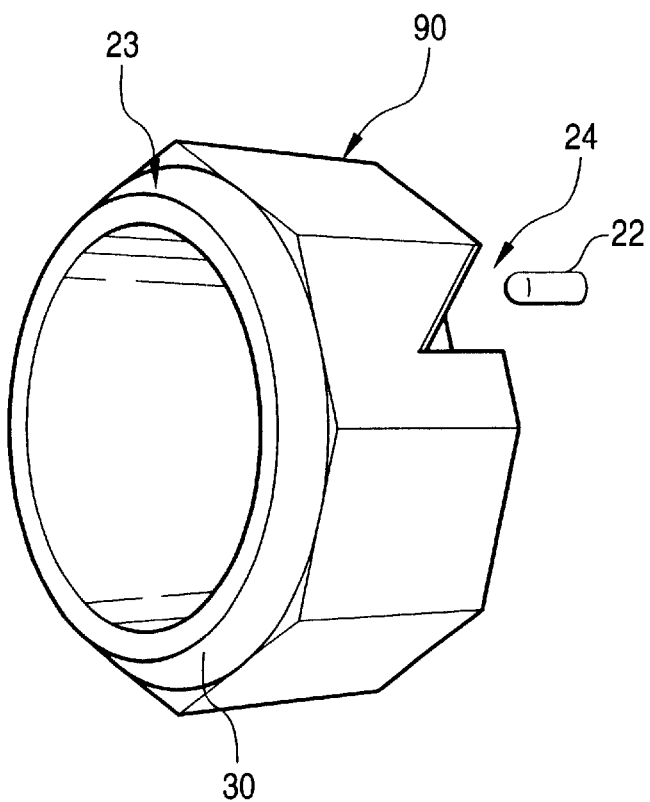
FIG. 9 is a perspective view showing the external appearance of another modified example of the illuminating device according to the present invention.

(2) Although the aforementioned embodiment has shown the case in which the light guiding member 21 formed in a hollow-cylindrical like manner is used, the present invention is not limited thereto. For example, the present invention may be applied also to the case in which a light guiding member 90 formed in an octagonal tubular manner is used as shown in FIG. 9. In the case in which the light guiding member 90 is used, the luminous body 23 can be made to emit light in a wider region in comparison with the related illuminating device (if having the same number of light sources) shown in FIG. 1. It is a matter of course that a light guiding member may be formed in any polygonal tubular manner other than the octagonal tubular manner.

(3) Although the aforementioned embodiment has shown the case in which light emitted from one light source 22 enters the light guiding member 21, the present invention is not limited thereto. For example, the present invention may be applied also to the case in which light emitted from a plurality of light sources enters the light guiding member 21. Thus, the tapered surface 30 can be made to emit light more brightly in a further wider region. In this case, a plurality of light entering portions 24 may be preferably formed correspondingly to the number of light sources.

(4) Although the aforementioned embodiment has shown the case in which light enters from the light entering portion 24 having the sheet mirror 41, the present invention is not limited thereto. For example, the present invention may be applied also to the case in which a light source 22 is disposed so as to emit light in a direction substantially perpendicular to the axial direction of the light guiding member 21 as represented by the arrow in FIG. 10A, and a light entering surface 110 is provided so as to be substantially perpendicular to the light. In the case in which light enters from the light entering surface 110, the light entering the light guiding member 21 is guided spirally to the luminous body 23 so that the tapered surface 30 emits light in the same manner as in the aforementioned embodiment.

Figure 10A:
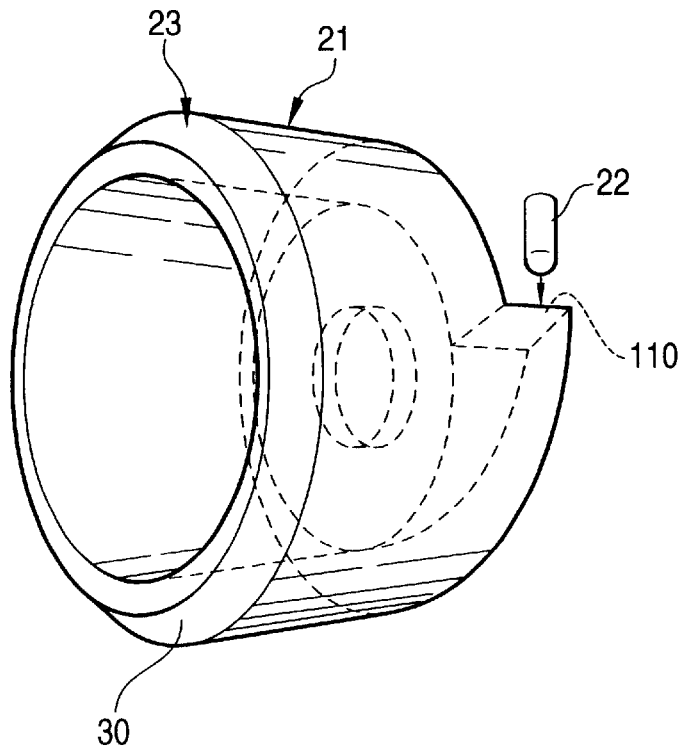
FIG. 10A is a perspective view showing the external appearance of another modified example of the illuminating device according to the present invention.
Figure 10B:
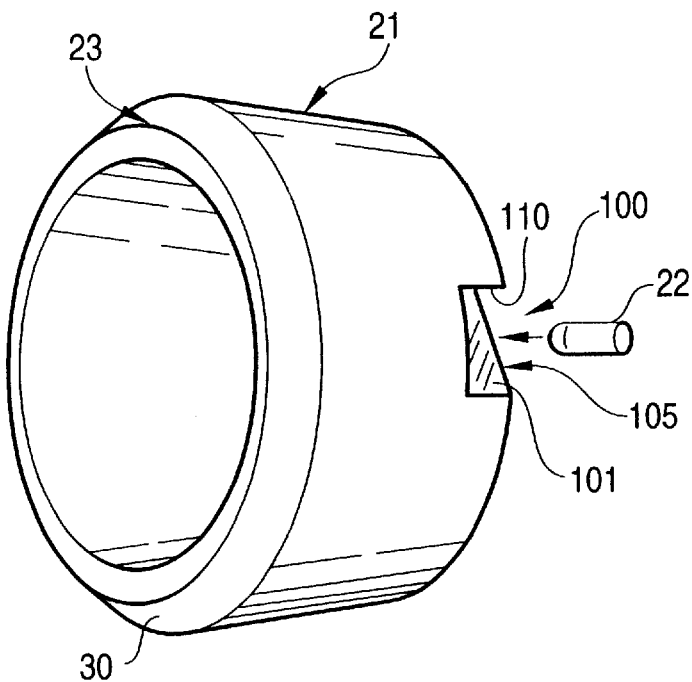
FIG. 10B is a perspective view showing the external appearance of another modified example of the illuminating device according to the present invention.
Figure 10C:
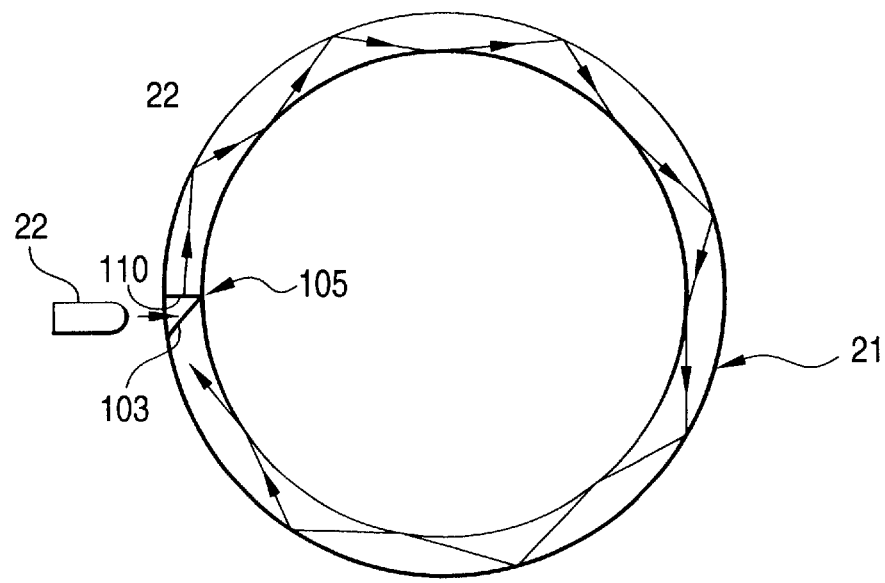
FIG. 10C is a view typically showing light guided in a light guiding member of the illuminating device of FIG. 10B as viewed from the bottom thereof.

Further, for example, the present invention may be applied also to the case in which a light source 22 is disposed so as to emit light toward the axis of the light guiding member 21 and in a direction substantially perpendicular to the axial direction of the light guiding member 21 as represented by the arrow in FIG. 10B. A light entering portion 100 includes a notch portion 105 which is formed by notching the light guiding member 21. As shown in FIG. 10C, the notch portion 105 has an inclined surface 103 which is inclined at about 45° (degrees) with respect to an irradiating direction of light emitted from the light source 22. A sheet mirror 101 is disposed on the inclined surface 103. In the case in which light enters from the light entering surface 110, the light entering the light guiding member 21 is guided spirally to the luminous body 23 so that the tapered surface 30 emits light in the same manner as in the aforementioned embodiment.

Figure 11:
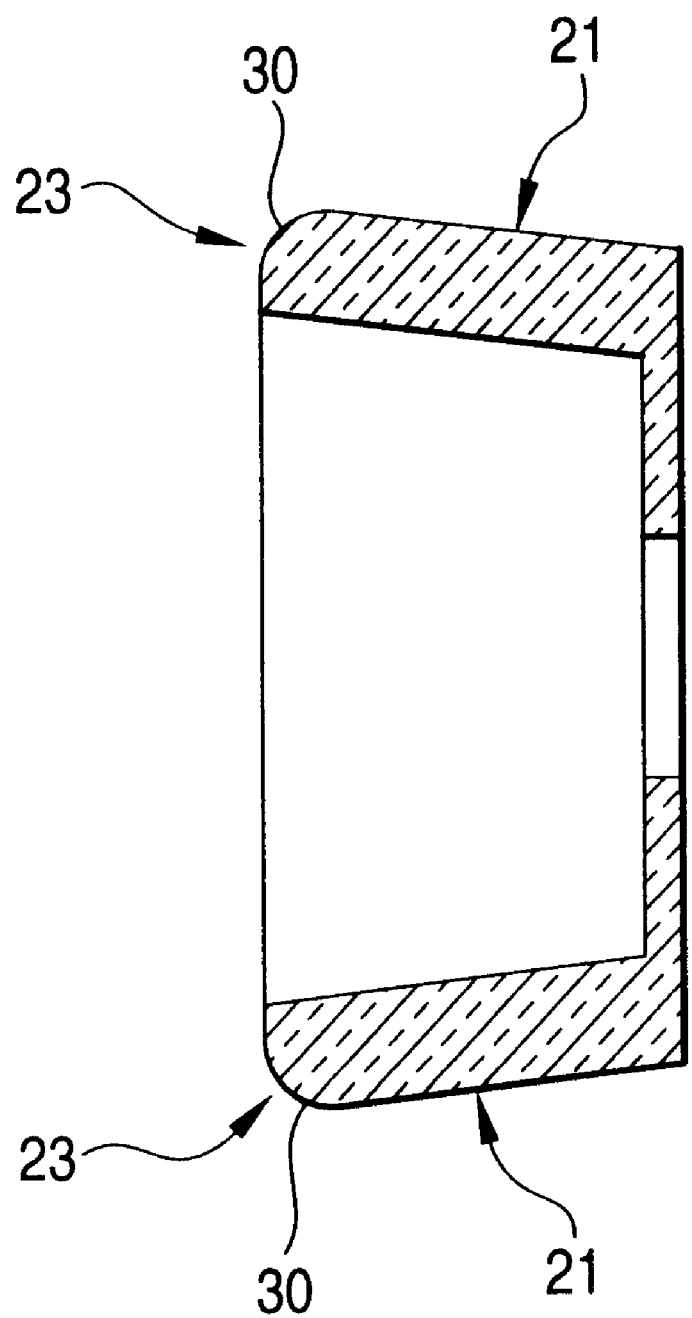
FIG. 11 is a side sectional view of another modified example of the luminous body according to the present invention.

(5) Although the aforementioned embodiment has shown the case in which the tapered surface 30 is formed in a concave-surface like manner, the present invention is not limited thereto. For example, the present invention may be applied also to the case in which the tapered surface 30 is formed in a convex-surface like manner as shown in FIG. 11. In this case, the amount of light emitted in the lateral direction from the luminous body 23 may be reduced but the amount of light emitted in the front side (the left side of FIG. 11) can be increased in comparison with the aforementioned embodiment. Accordingly, the shape of the tapered surface 30 may be determined in accordance with the purpose of use of the illuminating device. Namely, when it is required to increase the amount of light emitted in the lateral direction from the luminous body 23, the tapered surface 30 may be formed in a concave-surface like manner, and when it is required to increase the amount of light emitted from the front side of the luminous body 23, the tapered surface 30 may be formed in a convex-surface like manner.

Figure 12:
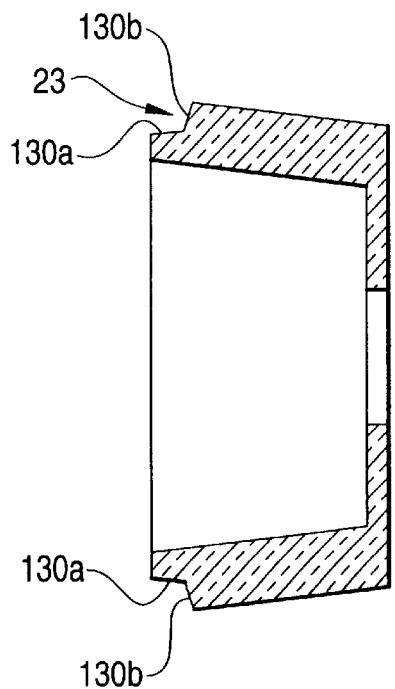
FIG. 12 is a side sectional view of another modified example of the luminous body according to the present invention.

(6) Further, although the above-described modification has shown the case in which the luminous body 23 has the tapered surface 30 formed in a concave or convex surface like manner, the present invention may be applied also to the case in which the luminous body 23 has an angular surface. For example, as shown in FIG. 12, the luminous body 23 may have two surfaces 130a and 130b, between which an angle is formed, instead of the tapered surface 30. The surface 130a may be tapered, and also the surface 130b may be tapered. Similar to the aforementioned embodiment, the surfaces 130a and 130b may be processed in an aventurine-like manner, a frosted-glass like manner, or the like. According to such the construction, the luminous body 23 can be made to emit light in a wider region because of the surfaces 130a and 130b.

Figure 13:
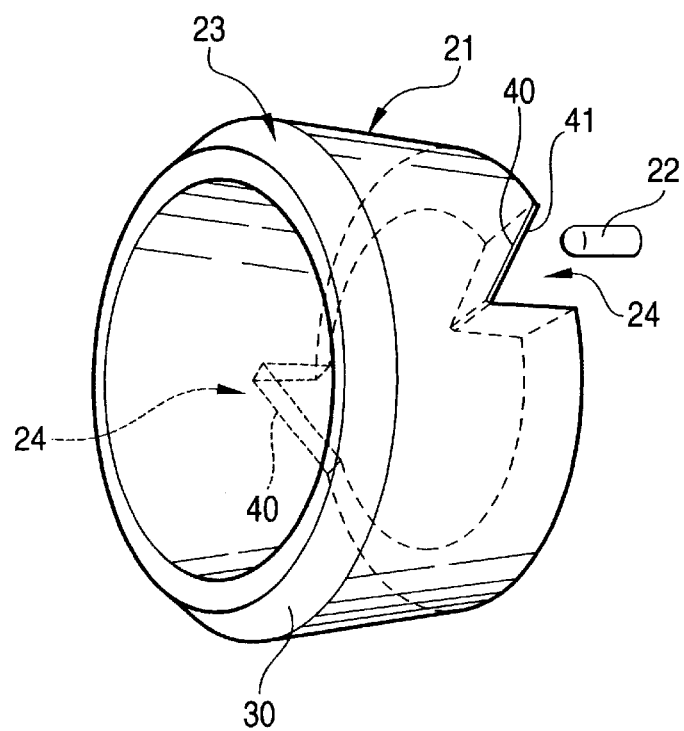
FIG. 13 is a perspective view showing the external appearance of another modified example of the illuminating device according to the present invention.

(7) Although the aforementioned embodiment has shown the case in which a light guiding member 21 has one light entering portion 24, the present invention is not limited thereto. That is, the light guiding member 21 may have a plurality of light entering portions. As an example, FIG. 13 shows the light guiding member 21 having two light entering portions 24 and 24. Inclined surfaces 40 and 40 of the light entering portions 24 and 24 are symmetrically arranged with respect to the axis of the light guiding member 21. Incidentally, the sheet mirror 41 is disposed on only one of the inclined surfaces 40, and also, the light source 22 is used only for the light entering portion 24 having the sheet mirror 41. According to such the construction, the amounts of light emitted from two portions of the luminous body 23 corresponding to the projection of the inclined surfaces 40 and 40 in the axial direction of the light guiding member 21 are increased in comparison with the other portions. Accordingly, a more balanced graceful-illumination can be obtained.

(8) Although the aforementioned embodiment has shown the case in which the light guiding member 21 and the columnar knob 20 are formed separately with each other as individual devices, the present invention is not limited thereto. That is, the light guiding member 21 may be integrated with the knob 20. In this case, since the light entering portion 24 provided in the light guiding member 21 is to be rotated along with the knob 20, the light source 22 needs to be arranged to be rotatable.

Incidentally, the light guiding member 21 and the luminous body 23 may be formed separately with each other as individual parts.

Figure 14A:
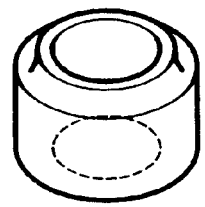
FIGS. 14A, 14B and 14C show configuration examples of the light guiding member.
Figure 14B:
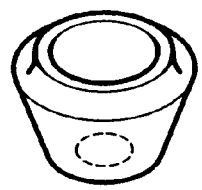
Figure 14C:
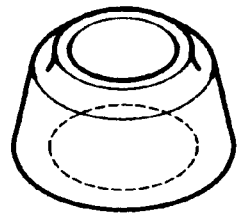

(9) Finally, the specific configuration of the light guiding member is not limited to the aforementioned embodiment and the modified examples. For example, any one of configurations shown in FIGS. 14A to 14C may be utilized for the light guiding member. Incidentally, FIG. 14A shows a pure columnar shape, FIG. 14B shows a slightly-narrowed bottom shape, and FIG. 14C shows a slightly-widened bottom shape.

As described above, according to the present invention, the annular luminous body can be made to emit light in a wider region with the simple construction.

What is claimed is:

1. An illuminating device which receives light emitted from a light source and emits light, the illuminating device comprising:
   a substantially cylindrical light guiding member for guiding light; and an annular luminous body connected to a first end portion of the light guiding member, the luminous body being formed to emit light guided by the light guiding member,
   wherein the luminous body includes a tapered outer surface formed into one of an aventurine-like surface and a frosted-glass like surface so as to emit the light.

2. An illuminating device which receives light emitted from a light source so as to emit light, the illuminating device comprising:
   a substantially cylindrical light guiding member for guiding light;
   a light entering portion formed on one end of said light guiding member, for leading the light emitted from the light source into the light guiding member so as to be spirally guided in the light guiding member; and
   an annular luminous body connected to a first end portion of the light guiding member, the luminous body being formed to emit light guided by the light guiding member.

3. The illuminating device of claim 2, wherein the luminous body includes a tapered outer surface formed to emit the light.

4. The illuminating device of claim 3, wherein the tapered outer surface has a concave surface when viewed from a cross-section of the annular luminous body perpendicular to a longitudinal axis of the annular luminous body.

5. The illuminating device of claim 2, wherein the light source is directed to said end which is a second end portion of the light guiding member, and emits the light in a direction substantially parallel with an axial direction of the light guiding member.

6. The illuminating device of claim 2, wherein the light guiding member is formed in a hollow substantially cylindrical shape.

7. The illuminating device of claim 2, wherein the light source is operatively positioned to emit beam-like light toward the light guiding member.

8. The illuminating device of claim 2, further comprising a reflection member disposed on the light entering portion, wherein the light emitted from the light source is reflected by the reflection member, and enters the light guiding member.

9. An illuminating device which receives light emitted from a light source so as to emit light, the illuminating device comprising:
   a substantially cylindrical light guiding member for guiding light;
   a reflection member formed on one end of said light guiding member, wherein the light emitted from the light source is reflected by the reflection member, and enters the light guiding member; and
   an annular luminous body connected to a first end portion of the light guiding member, the luminous body being formed to emit light guided by the light guiding member.

10. An illuminating device which receives light emitted from a light source so as to emit light, the illuminating device comprising:
    a substantially cylindrical light guiding member for guiding light; and
    an annular luminous body connected to a first end portion of the light guiding member, the luminous body being formed to emit light guided by the light guiding member,
    wherein the light emitted from the light source enters a second end portion of the light guiding member, and is spirally guided by the light guiding member.

11. An operating device, comprising:
    a light source for emitting light;
    a substantially cylindrical light guiding member for guiding light received from the light source and having a hollow portion;
    an annular luminous body connected to a first end portion of the light guiding member, the luminous body being formed to emit light guided by the light guiding member; and
    an operating knob partially insertable in the hollow portion of the light guiding member,
    wherein the luminous body includes a tapered outer surface formed into one of an aventurine-like surface and a frosted-glass like surface so as to emit the light.

12. An operating device, comprising:
    a light source for emitting light;
    a substantially cylindrical light guiding member for guiding light received from the light source and having a hollow portion;
    an annular luminous body connected to a first end portion of the light guiding member, the luminous body being formed to emit light guided by the light guiding member;
    an operating knob partially insertable in the hollow portion of the light guiding member; and
    a light entering portion formed on one end of said light guiding member, for leading the light emitted from the light source into the light guiding member so as to be spirally guided in the light guiding member.

13. The operating device of claim 12, wherein the luminous body includes a tapered outer surface formed to emit the light.

14. The illuminating device of claim 13, wherein the tapered outer surface has a concave surface when viewed from a cross-section of the annular luminous body perpendicular to a longitudinal axis of the annular luminous body.

15. The operating device of claim 12, wherein the light source is directed to said end which is a second end portion of the light guiding member, and emits the light in a direction substantially parallel with an axial direction of the light guiding member.

16. The operating device of claim 15, wherein the tapered outer surface has a concave surface when viewed from a cross-section of the annular luminous body perpendicular to a longitudinal axis of the annular luminous body.

17. The operating device of claim 12, wherein the light source is operatively positioned to emit beam-like light toward the light guiding member.

18. The operating device of claim 12, further comprising a reflection member disposed on the light entering portion, wherein the light emitted from the light source is reflected by the reflection member, and enters the light guiding member.

19. An audio apparatus comprising an operating device defined in claim 12.

20. An operating device, comprising:
    a light source for emitting light;
    a substantially cylindrical light guiding member for guiding light received from the light source and having a hollow portion;
    a reflection member formed on one end of said light guiding member, wherein the light emitted from the light source is reflected by the reflection member, and enters the light guiding member;
    an annular luminous body connected to a first end portion of the light guiding member, the luminous body being formed to emit light guided by the light guiding member; and
    an operating knob partially insertable in the hollow portion of the light guiding member.

21. An operating device, comprising:
    a light source for emitting light;
    a substantially cylindrical light guiding member for guiding light received from the light source and having a hollow portion, wherein the light emitted from the light source enters a second end portion of the light guiding member, and is spirally guided by the light guiding member;
    an annular luminous body connected to a first end portion of the light guiding member, the luminous body being formed to emit light guided by the light guiding member; and
    an operating knob partially insertable in the hollow portion of the light guiding member.

* * * * *